(12) United States Patent
Zhang

(10) Patent No.: US 7,059,449 B2
(45) Date of Patent: Jun. 13, 2006

(54) FOLDABLE TIRE STEP APPARATUS

(75) Inventor: Shouyun Zhang, Chino Hills, CA (US)

(73) Assignee: Larin Corporation, Ontario, CA (US)

( * ) Notice: Subject to any disclaimer, the term of this patent is extended or adjusted under 35 U.S.C. 154(b) by 0 days.

(21) Appl. No.: 10/893,465

(22) Filed: Jul. 15, 2004

(65) Prior Publication Data

US 2006/0027422 A1 Feb. 9, 2006

(51) Int. Cl.
- *E04G 3/30* (2006.01)
- *E06C 5/00* (2006.01)
- *B60R 3/00* (2006.01)

(52) U.S. Cl. ............ 182/150; 182/127; 182/91; 280/163; 280/165

(58) Field of Classification Search .......... 182/91, 182/92, 127, 150; 280/163, 165, 166; 296/62
See application file for complete search history.

(56) References Cited

U.S. PATENT DOCUMENTS

| | | | | |
|---|---|---|---|---|
| 3,590,950 A | * | 7/1971 | Wilson | 182/150 |
| 4,782,916 A | * | 11/1988 | Hays | 182/150 |
| 4,800,987 A | * | 1/1989 | Liles | 182/92 |
| 4,911,264 A | * | 3/1990 | McCafferty | 182/92 |
| 4,947,961 A | * | 8/1990 | Dudley | 182/92 |
| 5,111,909 A | | 5/1992 | Liu | |
| 5,133,429 A | * | 7/1992 | Densley | 182/150 |
| 5,456,479 A | * | 10/1995 | Conger | 280/165 |
| 6,044,928 A | * | 4/2000 | Law et al. | 182/150 |
| 6,457,558 B1 | * | 10/2002 | Ehnes | 182/150 |
| 6,550,578 B1 | * | 4/2003 | Law et al. | 182/150 |
| 6,767,023 B1 | * | 7/2004 | Nicholson | 280/165 |

* cited by examiner

*Primary Examiner*—Hugh B. Thompson, II
(74) *Attorney, Agent, or Firm*—Greenberg Traurig, LLP

(57) ABSTRACT

An apparatus and method that attaches to a tire and supplies a step to enable access to the engine compartment or rooftop of a vehicle is provided. The apparatus is adjustable to better fit with a variety of different sized tires. The apparatus is also adjustable to allow the apparatus to rest at different height locations on the tire. Additionally, the tire step can be folded for easier storage.

6 Claims, 3 Drawing Sheets

FOLDABLE TIRE STEP APPARATUS

BACKGROUND

1. Field

An apparatus and method is disclosed relating to use as a step or a platform, and more particularly, relating to a step for installation on a vehicle tire.

2. General Background

Due to the height off of the ground of some vehicles and trucks, mechanics cannot reach the engine to complete their work. The top of large vehicles can be difficult to reach when washing the vehicle. Additionally, many sport utility vehicles and vans allow for extra storage on the rooftop of their vehicles that can be difficult to reach. To combat this problem, many apparatus and devices have been previously used as a step that fits over a vehicle tire. These tire steps have been developed to allow easier access to the engine or to the rooftop.

The various uses of tire steps require that the height of the step off of the ground be varied. Many of the previous tire steps do not allow for adjustment of the height of the step. The tire steps that do allow height adjustment only allows for adjustment of the platform on the apparatus.

The disclosure is directed towards an improvement which seeks to allow adjustment to the height of the apparatus as it rests on the tire and to correspond better with different tire widths.

SUMMARY

One feature of this disclosure allows for adjustment of the hanging structure along the width of the tire. By changing the width of the structure, the height of the apparatus as positioned on the tire can be changed. An individual can reach higher on the vehicle or farther into the engine underneath the hood as the height of where the apparatus rests on the tire is varied. This also allows people of different sizes to comfortably work with the vehicle.

Another feature of the disclosed method and apparatus is to allow for both width and depth adjustment of the tire step. The depth of the tire step is adjusted by allowing the joining members and legs of a hanging structure to be connected at different points. The depth adjustment allows the structure to fit with a variety of different tires. The joining members and arms of the apparatus can also be adjusted by width to allow the tire step to rest on different heights of the tire.

Another feature of the width adjustment in the disclosure allows the hanging structure to correspond better with a variety of different sized tires. The width of different sized tires varies not only along the depth of the tire but also along the circumference of the tire. The width adjustment available with this apparatus addresses the different circumference of various tires. The disclosure allows a better fit with more tires.

Another feature of the disclosure allows for the apparatus to be folded for easier storage. The arms and legs of the hanging structure are connected using hinges. The step platform is also connected to the hanging structure using hinges.

Other objects and features of the disclosure will become apparent from the following detailed description and accompanying drawings.

DETAILED DESCRIPTION

Figure 1:
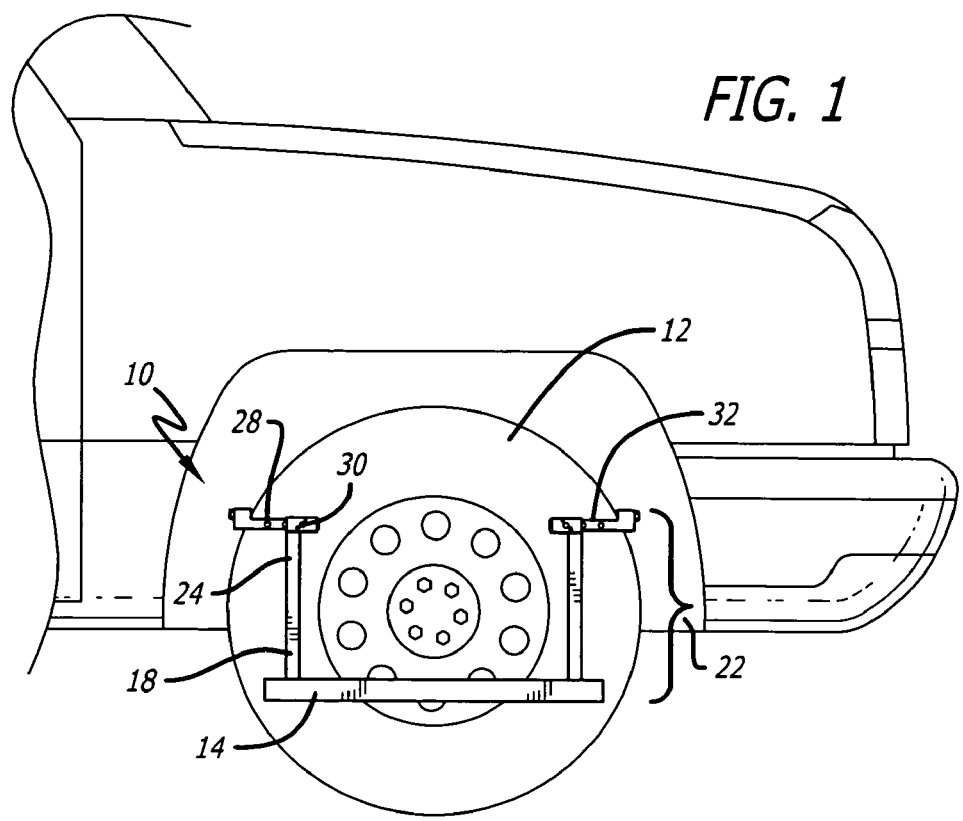
FIG. 1 illustrates the tire step apparatus in its widest configuration and its position on a tire of a vehicle.

A tire step 10 includes a hanging structure 22 and a step platform 14. The hanging structure includes arms 24, connecting members 32 and a support. The support includes legs 40 and joining members 48. To adjust the height of the tire step 10 as it rests on the tire 12, the arms 24 and the joining members 48 are adjustable. The width and depth of the support is also adjustable where the legs 40 are attached to the joining members 48.

Figure 2:
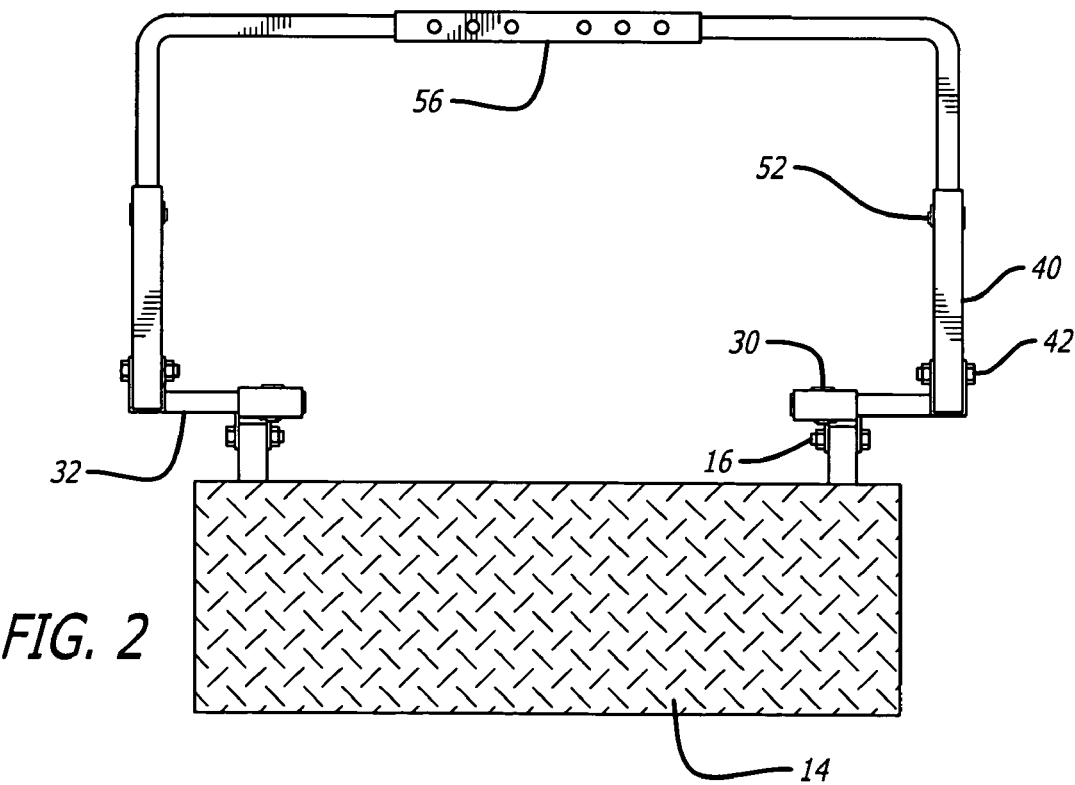
FIG. 2 is a top view of the tire step apparatus in a wide configuration.

FIGS. 1 and 2 illustrate one exemplary embodiment. An apparatus used as a tire step 10 is shown in its widest configuration. The tire step 10 is mounted onto a tire 12 to allow easier access to the engine compartment or the roof of the vehicle. In its widest configuration, the tire step 10 is mounted lower on the tire 12. The apparatus includes a step platform 14 attached with a bolt 16 to a hinge member 18. The hinge member 18 is connected to the hanging structure using a locking pin 20.

The hanging structure 22 has spaced apart L-shaped arms 24. In other embodiments, the arm can have different shapes. The hinge members 18 engage the arms 24 with a locking pin 20. The arms extend upward from the step platform 14. Located on the opposing end of the arm 24 is a hole 28 where a locking pin 30 is engaged. The locking pin 30 is also engaged with a connecting member 32. There exists many different ways to connect the two members together, such as bolts and other fastening devices engaging the two members together. The various embodiments would be obvious to one skilled in the art.

FIG. 2 illustrates the top view of this embodiment. A bolt 42 is engaged with a hole 44 in a leg 40 in the support of the hanging structure. The opposing end of the leg 40 has another hole 46 where a joining member 48 formed with a plurality of holes 50 can be connected. Adjustment of the hanging structure 22 here alters the depth and width of the support of tire step 10 and enables the tire step 10 to be used with a variety of different sized tires. A locking pin 52 connects the joining member 48 as it is inserted through the leg 40 at one of the holes 50. On the opposing end of the joining member 48 is another hole 54 that engages a linking member 56 with a fastening device. Adjustment of the tire step 10 here enables the platform 14 to be placed at different heights.

Figure 3:
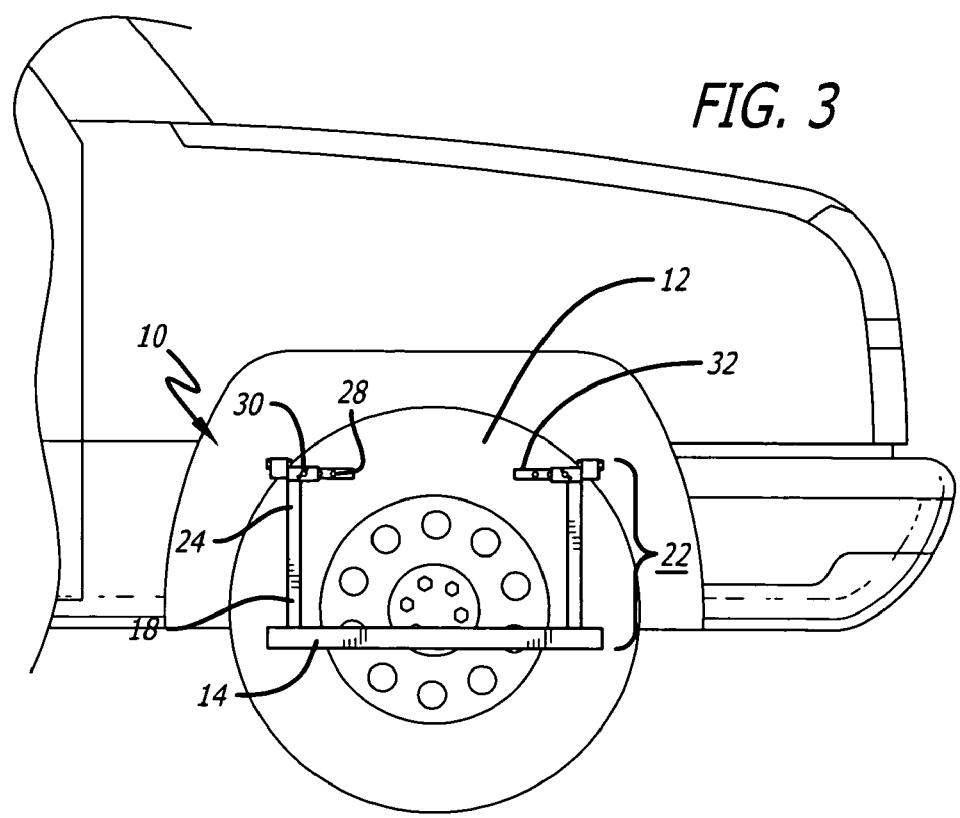
FIG. 3 illustrates the tire step apparatus in a more narrow configuration and its position on a tire of a vehicle.
Figure 4:
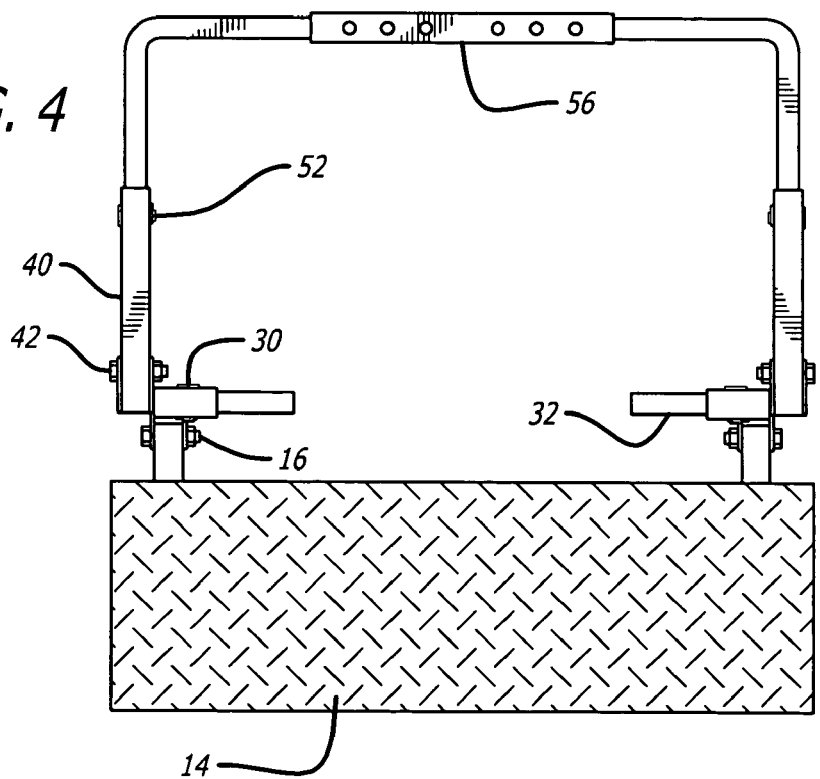
FIG. 4 is a top view of the tire step apparatus in the more narrow configuration.

FIGS. 3 and 4 illustrates this embodiment of the tire step apparatus 10 in a more narrow configuration. FIG. 3 demonstrates that when the width of the tire step 10 is adjusted, the apparatus can be mounted higher on the tire 12. Correspondingly, the tire step 10 allows the user to reach higher on the vehicle. As shown, the linking member 56 is produced with a variety of spaced apart holes 60. The tire step 10 can be adjusted by width using the linking member 56 and the connecting members 32. The two joining members 48 are able to slide through the linking member 56 and attached using a locking pin 58 at one of the variety of holes 60.

Figure 6:
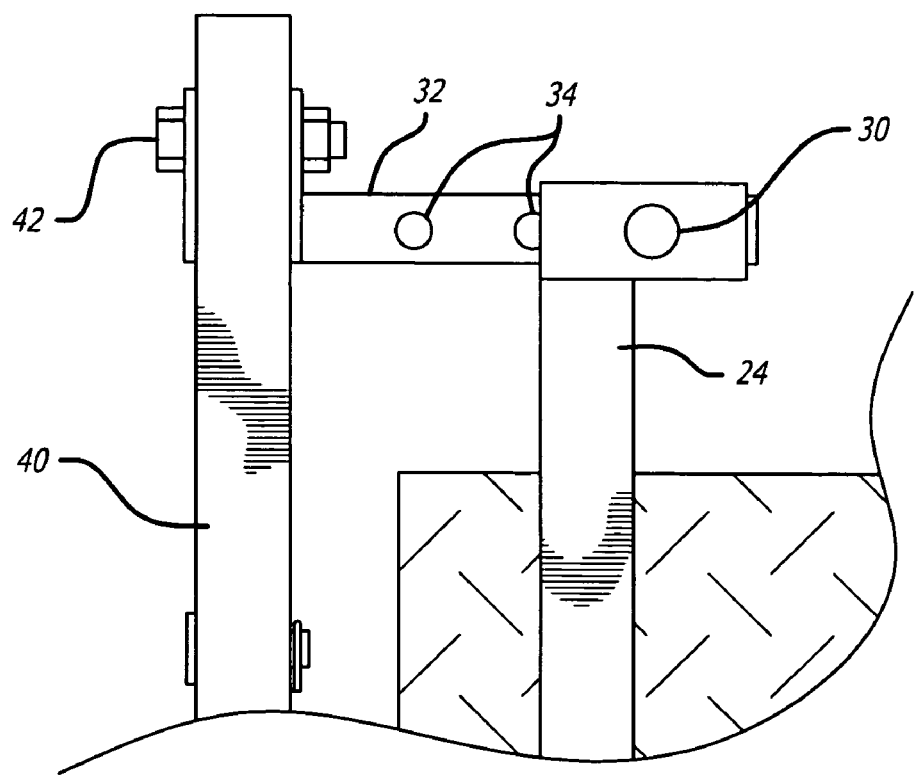
FIG. 6 illustrates a detail view of the tire step apparatus.

FIG. 6 illustrates a detail view of this embodiment showing the connecting member 32 that is also used to adjust the width of the tire step 10. The connecting member 32 has a plurality of spaced apart holes 34 where the arm 18 of the hanging structure 22 is connected. The connecting member 32 contains a hole 38 where the legs 40 of the hanging structure 22 is connected. In this embodiment, a bolt 42 connects the leg to the connecting member the hole 38.

To adjust the height of the tire step 10 as it sits on a tire, the width of the tire step is adjusted. To make the apparatus wider and rest lower on the tire as in FIG. 1, the joining members 48 are connected to the linking member 56 with a linking pin at the holes 60 towards the outside of the apparatus. Also, the L-shaped arms 24 are connected to the connecting members 32 at the holes 34 towards the inside of the apparatus. This enables the platform 10 to be located at different heights on the tire 12.

Figure 5:
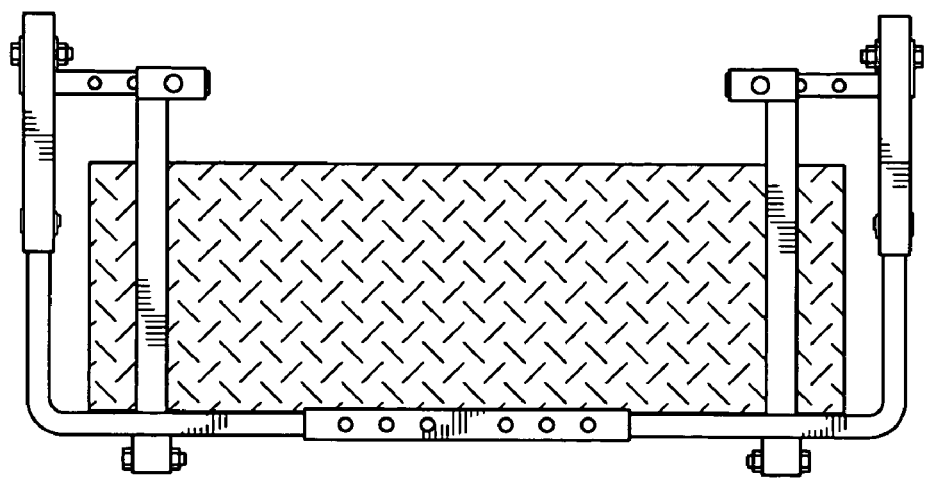
FIG. 5 shows the tire step apparatus in a folder position for easier storage.

FIG. 5 illustrates the tire step in the folded position. The legs 40 of the hanging structure 22 rotate downward about the bolt 42 connecting the leg 40 to the connecting member 32. The platform 14 rotates up towards the arms about the bolt 16 connecting the hinge member 18 to the platform 14. The rotation of these elements allow the tire step apparatus 10 to be folded for easier storage. Other hinge components could also be utilized to perform the same function in other embodiments.

While the apparatus and method has been described in terms of what is presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures.

What is claimed is:

1. A tire step for a vehicle comprising:
   a step platform, the platform for supporting a user; and
   a hanging structure having spaced apart on each side of the structure an arm, the arm being intended for location adjacent to a tire, the arm being attached to a connecting member through a slidable connection and allowing for width adjustment of the tire step by sliding the arm longitudinally relative to the connecting member and attaching the arm at a different location on the connecting member, the platform being connected to the arms of a hanging structure, the connecting member being attached to a support, the support having a pair of spaced apart legs, the spaced apart leg being attached to a joining member and allowing for depth adjustment of the support, and the joining member being attached to a linking member through a slidable connection and allowing for the width adjustment of the support by sliding the joining member longitudinally relative to the linking member and attaching the joining member at a different location on the linking member.

2. The tire step in claim 1 wherein the tire step is foldable having a first hinge mounted between the step platform and the arms permitting rotation of the step platform towards the arms.

3. The tire step in claim 2 wherein the tire step is foldable having a second hinge mounted between the support and the connecting member permitting rotation of the support towards the arms.

4. A foldable tire step for vehicles comprising:
   a step platform, the platform for supporting a user; and
   a hanging structure having spaced apart on each side of the structure an arm, the arm being intended for location adjacent to a tire, the arm being connected with a fastening device to one of a pair of connecting members by a slidable connection, the connecting member sliding longitudinally relative to the arm and allowing for width adjustment of the tire step and subsequent height adjustment of the platform relative to the tire, the platform connected to the arms, the connecting members being formed with a plurality of points to engage the fastening device, a pair of spaced apart legs attached to the connecting members, a pair of joining members formed with a plurality of points at a first end, a fastening device connecting the joining members at the first end to the legs by a sliding connection, the joining member sliding longitudinally relative to the leg and allowing for depth adjustment of the support, and a linking member formed with a plurality of points to engage a fastening device and attached to the pair of joining members at a second end by a slidable connection, the pair of joining members sliding longitudinally relative to the linking member and allowing for the width adjustment of the support and the consequent height adjustment of the platform relative to the tire.

5. A method for adjusting the height of a platform of a tire step by adjusting the location of a support to be locatable at different heights on a tire, the method comprising:
   adjusting the width of a support through interlocking elements, the elements comprising an arm locked through a slidable connection to a connecting member wherein the arm slides longitudinally relative to the connecting member to define different widths relative to the tire on the front of the tire step, a pair of arms being attached to the platform, the arm, platform, and connecting member defining a hanging structure, and a pair of joining members locked to a linking member through a slidable connection wherein the joining member slides longitudinally relative to the linking member to define different widths relative to the tire on the rear of the tire step, a pair of legs, the pair of joining members and the linking member defining a support, the hanging structure attached the hanging structure; and
   adjusting the depth of the support through interlocking elements, the elements including one of the pair of joining members locked and through a slidable connection to one of the pair of legs, the joining members sliding longitudinally relative to the legs to define different depths relative to the tire whereby the width and depth adjustment permit for locating a platform depending from the support at different heights relative to the tire.

6. A method for adjusting the height of a platform of a tire step by adjusting the location of a support to be locatable at different heights on a tire, the method comprising:
   adjusting the width of a support through interlocking elements, the elements comprising an arm looked through a slidable connection to a connecting member to define different widths relative to the tire on the front of the tire step, a pair of arms being attached to the platform, the arm, platform, and connecting member defining a hanging structure, and a pair of joining members locked to a linking member through a slidable connection wherein the joining members slide longitudinally relative to the linking member to define different widths relative to the tire on the rear of the tire step, a pair of legs, the pair of joining members and the linking member defining a support, the hanging structure attached the hanging structure; and
   the width adjustment permit for locating a platform depending from the support at different heights relative to the tire.

* * * * *